United States Patent
Li et al.

(10) Patent No.: US 8,619,779 B2
(45) Date of Patent: Dec. 31, 2013

(54) SCALABLE ARCHITECTURE FOR ENTERPRISE EXTENSION IN A CLOUD TOPOLOGY

(75) Inventors: Li Erran Li, Edison, NJ (US); Thomas Woo, Short Hills, NJ (US)

(73) Assignee: Alcatel Lucent, Paris (FR)

(*) Notice: Subject to any disclaimer, the term of this patent is extended or adjusted under 35 U.S.C. 154(b) by 887 days.

(21) Appl. No.: 12/571,257

(22) Filed: Sep. 30, 2009

(65) Prior Publication Data

US 2011/0075674 A1    Mar. 31, 2011

(51) Int. Cl.
H04L 12/28    (2006.01)

(52) U.S. Cl.
USPC .............................. 370/392; 370/401; 709/249

(58) Field of Classification Search
USPC .................................... 370/238, 392, 401, 409
See application file for complete search history.

(56) References Cited

U.S. PATENT DOCUMENTS

| | | | |
|---|---|---|---|
| 6,741,595 B2* | 5/2004 | Maher et al. | 370/392 |
| 6,804,776 B1* | 10/2004 | Lothberg et al. | 713/160 |
| 7,082,140 B1* | 7/2006 | Hass | 370/466 |
| 7,529,933 B2* | 5/2009 | Palekar et al. | 713/168 |
| 7,639,632 B2* | 12/2009 | Sarkar et al. | 370/254 |
| 7,693,073 B2* | 4/2010 | Soja-Molloy et al. | 370/238 |
| 7,730,210 B2* | 6/2010 | Kuik et al. | 709/245 |
| 7,987,289 B2* | 7/2011 | Mason et al. | 709/242 |
| 8,055,789 B2* | 11/2011 | Richardson et al. | 709/238 |
| 8,160,063 B2* | 4/2012 | Maltz et al. | 370/389 |
| 8,213,336 B2* | 7/2012 | Smith et al. | 370/254 |
| 8,219,653 B1* | 7/2012 | Keagy et al. | 709/222 |
| 8,259,720 B2* | 9/2012 | Farinacci et al. | 370/392 |
| 8,369,333 B2* | 2/2013 | Hao et al. | 370/392 |
| 8,381,209 B2* | 2/2013 | Reumann et al. | 718/1 |
| 2002/0075844 A1 | 6/2002 | Hagen | |
| 2003/0041237 A1 | 2/2003 | McElroy et al. | |
| 2008/0201486 A1 | 8/2008 | Hsu et al. | |
| 2008/0240100 A1* | 10/2008 | Smith et al. | 370/392 |
| 2009/0303880 A1* | 12/2009 | Maltz et al. | 370/235 |
| 2009/0307334 A1* | 12/2009 | Maltz et al. | 709/219 |
| 2010/0008253 A1* | 1/2010 | Mellachervu et al. | 370/254 |
| 2010/0027552 A1* | 2/2010 | Hill | 370/401 |
| 2010/0235526 A1* | 9/2010 | Carter et al. | 709/229 |
| 2010/0235630 A1* | 9/2010 | Carter et al. | 713/162 |
| 2010/0318609 A1* | 12/2010 | Lahiri et al. | 709/205 |
| 2012/0014386 A1* | 1/2012 | Xiong et al. | 370/392 |

* cited by examiner

Primary Examiner — Brian O'Connor
(74) Attorney, Agent, or Firm — Kramer & Amado P.C.

(57) ABSTRACT

Various embodiments relate to a Cloud Data Center, a system comprising the Cloud Data Center, and a related method. The Cloud Data Center may include a logical customer edge router to send packets between addresses in a private enterprise network and addresses in a logical network within a cloud network. The logical network may have resources, known as virtual machines, allocated to the private enterprise network and may share a common IP address space with the private enterprise network. A directory at the Cloud Data Center may correlate the enterprise IP addresses of virtual machines with a cloud IP address and a location IP address within the logical network. The Cloud Data Center may double encapsulate packets with two specified headers, a cloudIP and locIP header, when sending a packet to a destination in the logical network.

24 Claims, 7 Drawing Sheets

| | 301 | 302 | 303 | 304 |
|---|---|---|---|---|
| | entIP | locIP | cloudIP | next Hop |
| 311 | 10.1.8.8 | 20.2.2.8 | 20.2.2.1 | 20.2.2.8 |
| 312 | 10.1.8/24 | | | Dir Server |
| 313 | 10.1/16 | | | PE |
| | ... | | | |

*FIG. 3*

| | 301 | 302 | 303 |
|---|---|---|---|
| | entIP | locIP | cloudIP |
| 411 | Default | $IP_{CA}$ | |
| 412 | 10.1.8.8 | 20.2.2.8 | 20.2.2.1 |
| | ... | | |
| | ... | | |

*FIG. 4*

SCALABLE ARCHITECTURE FOR ENTERPRISE EXTENSION IN A CLOUD TOPOLOGY

TECHNICAL FIELD

Embodiments disclosed herein relate generally to network infrastructure and Internet communications.

BACKGROUND

A cloud computing network is a highly-scalable, dynamic service, which allows cloud computing providers to provide resources to customers over the Internet. The cloud infrastructure provides a layer of abstraction, such that customers do not require knowledge of the specific infrastructure within the cloud that provides the requested resources. Such a service helps consumers avoid capital expenditure on extra hardware for peak usage, as customers can use the extra resources in the cloud for heavy loads, while using the infrastructure already in place in a private enterprise network for everyday use.

For example, systems such as infrastructure as a service (IaaS), allow customers to rent computers on which to run their own computer applications. Such systems allow scalable deployment of resources, wherein customers create virtual machines, i.e., server instances, to run software of their choice. Customers can create, use, and destroy these virtual machines as needed, with the provider usually charging for the active servers used.

Existing services, however, do not treat allocated resources like resources inside the private enterprise network. This may cause problems, for example, when applications send data to specific locations or when the internal network and the cloud network use different address spaces or addressing schemes. There are also problems associated with isolating cloud resources from malicious attacks and ensuring that connections to cloud network resources do not compromise the internal network infrastructure. In addition, customers may face added complexity in dealing with distinct sets of internal and cloud resources, instead of treating resources from both locations as equivalent.

Accordingly, there is a need beyond IaaS to seamlessly incorporate the resources allocated to a customer in the cloud network into the customer's existing private enterprise network. Such an extension would have all allocated cloud resources look and act similarly to the resources located within the private enterprise network. Such an implementation would allow an enterprise's workload to seamlessly spread over a dynamic mix of the resources of the dedicated private enterprise network and the allocated resources in the cloud topology.

In view of the foregoing, it would be desirable to seamlessly extend a private enterprise network to include resources in a cloud network. More specifically, it would be desirable to enable communications between resources in the private enterprise network and allocated resources in the cloud network so that customer could treat cloud resources in the same manner as resources on the private network. Other desirable aspects will be apparent to those of skill in the art upon reading and understanding the present specification.

SUMMARY

In light of the present need for seamless extension of a private enterprise network into a cloud network, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of incorporating resources of a cloud network into a private enterprise network. This may involve a Cloud Data Center creating a logical customer edge router in the Cloud Data Center in the cloud network, receiving an IP subnet that is within an address space of the private enterprise network, allocating an IP address from the IP subnet to each resource within a logical network in the cloud network comprising resources allocated to the private enterprise network, adding a routing entry for said IP subnet at a virtual routing and forwarding table at the logical customer edge router at the Cloud Data Center, forwarding the routing entry to all customer edge routers in the private enterprise network, and adding a default entry in a directory server, the default entry mapping all enterprise addresses to a location IP address and a cloud IP address of the logical customer edge router in the Cloud Data Center.

Various exemplary embodiments also relate to a method of sending a packet received from a source in a private enterprise network to a destination in a cloud network allocated to the private enterprise network. This may involve a logical customer edge router in a Cloud Data Center receiving a packet from a source in the private enterprise network, querying a directory server for the destination's cloud IP address and location IP address, encapsulating the received packet when the logical customer edge router determines the destination is within the logical network, further encapsulating the received packet with the destination's corresponding location IP header, and forwarding the received packet to the destination, wherein the logical customer edge router forwards the received packet through the destination location IP address to the destination cloud IP address.

Various exemplary embodiments also relate to a method of forwarding a packet originating from a source in a cloud network allocated to a private enterprise network. This may involve a hypervisor receiving a packet from a virtual machine in a logical network in the cloud network comprising resources allocated to the private enterprise network, querying a directory server in the logical network for a destination address when the packet's destination address is not in a virtual routing and forwarding table at the server hosting the virtual machine, encapsulating the packet with a cloud IP header, further encapsulating the packet with a location IP header, and forwarding the packet to the location IP address.

Various exemplary embodiments may also include a system extending a private enterprise network to a logical network in a cloud network comprising resources allocated to the private enterprise network. This may involve a series of servers in the logical network sharing the same IP address space as the private enterprise network. Each server may include a virtual machine comprising resources on the server allocated to the private enterprise network and a hypervisor hosting the virtual machine. The system may also include a logical customer edge router in the logical network sharing the same IP address space as the private enterprise network connecting the logical network to the private enterprise network, and at least a customer edge router in the private enterprise network.

Various exemplary embodiments may also include a logical customer edge router in a cloud network. The logical customer edge router may include a logical customer edge router connecting to at least one customer edge router in a private enterprise network and a server hosting a virtual machine allocated to the private enterprise network. The customer edge router in private network and the virtual machine and logical customer edge router in the cloud network may share a common IP address space allocated to the private enterprise network.

According to the foregoing, various exemplary embodiments place cloud resources inside the enterprise's private address space, thereby seamlessly integrating the cloud resources into the enterprise's existing topology. Various embodiments also ensure security by placing cloud resources inside the security boundary of the enterprise network, isolated from any resources outside the network. A customer may thereby configure the cloud resources in the same manner as he or she configures and manages the internal resources of the enterprise network. In addition to these benefits, various embodiments also maintain the advantages of the cloud computing paradigm, namely, the highly-dynamic scalability of cloud resources.

BRIEF DESCRIPTION OF THE DRAWINGS

Some embodiments of apparatus and/or methods in accordance with embodiments are now described, by way of example only, and with reference to the accompanying drawings, in which:

FIG. 3 is a schematic diagram of an exemplary Virtual Routing and Forwarding table for network devices found in the extended enterprise network;

FIG. 4 is a schematic diagram of an exemplary directory table of location entries for network devices found in the cloud network;

DETAILED DESCRIPTION

Figure 1:
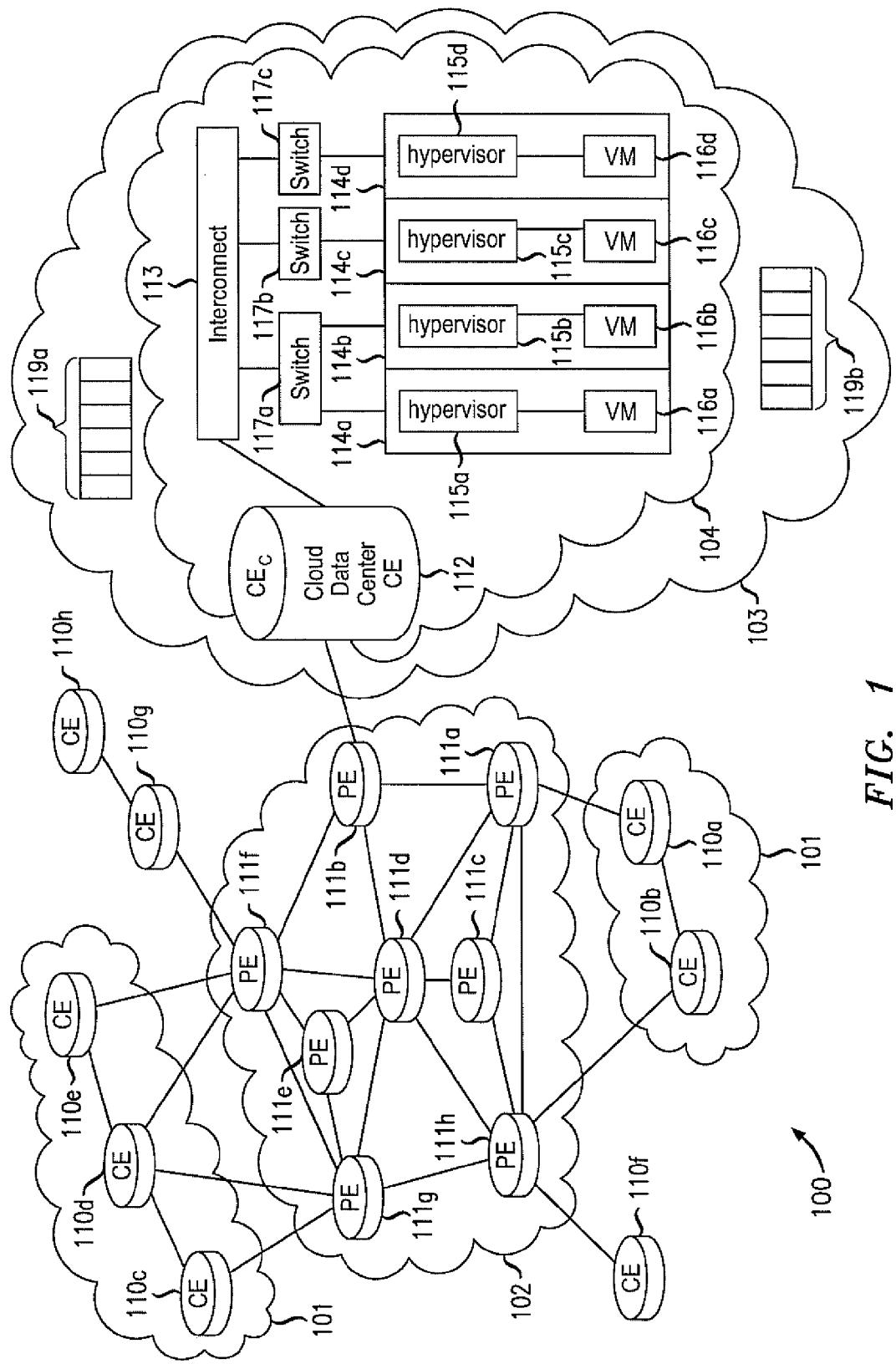
FIG. 1 is a schematic diagram of an exemplary network for extending a private enterprise network into a cloud network.

Referring now to the drawings, in which like numerals refer to like components or steps, there are disclosed broad aspects of various exemplary embodiments.

FIG. 1 is a schematic diagram of an exemplary network 100 for extending a private enterprise network into a cloud topology. In various exemplary embodiments, network 100 includes a private enterprise network 101, a service provider network 102, a cloud network 103, customer edge (CE) devices 110a-h, provider edge devices 111a-h, a Cloud Data Center CE 112, a Data Center Interconnect 113, and servers 114a-d, each of which houses a hypervisor 115a-d and a virtual machine 116a-d.

Private enterprise network 101, service provider network 102, and cloud network 103 may each be packet-switched networks. Such packet-switched networks may be any networks operating in accordance with a packet-based protocol. Thus, networks 101, 102, 103, may each operate, for example, according to Transmission Control Protocol/Internet Protocol (TCP/IP), Multi Protocol Label Switching (MPLS), Asynchronous Transfer Mode (ATM), Frame Relay, Ethernet, Provider Backbone Transport (PBT), or any other suitable packet-based protocol that will be apparent to those of skill in the art. More specifically, packet-switched networks 101, 102, 103 may communicate as a virtual private network (VPN) using Layer 3 protocols, such as MPLS.

Private enterprise network 101 may be a network incorporating hardware dedicated to a customer entity and may be configured such that the devices in the enterprise occupy the same address space. In an exemplary embodiment, private enterprise network 101 includes a series of customer edge (CE) devices 110a-e.

In the embodiment illustrated in FIG. 1, private enterprise network A (EntA) contains customer edge devices 110a-e located at two different sites that communicate with each other through the service provider network 102. In some embodiments, private enterprise network 101 may include devices that connect directly to each other at the same site.

The devices in the private enterprise network 101 may share the same address space, for example, sharing a 10.1 IP prefix. All devices in private enterprise network 101 may be located behind the same security boundary, such that network security may isolate devices inside the security boundary from devices outside the boundary and control the few allowed communications at the security border. This allows devices like customer edge devices 110a-f to freely pass traffic without having to implement precautions associated with crossing the security boundary.

Service provider network 102 may act as a host to private enterprise network 101. Service provider network 102 may include a series of provider edge (PE) devices 111a-h. Service provider network 102 may connect private enterprise network 101 with other networks, such as the cloud network 103, other private enterprise networks, or the Internet, among others. In some embodiments, the service provider network 102 may connect disparate portions of private enterprise network 101, though these disparate portions may share the same address space.

Cloud network 103 may include one or more servers 114a-d, which may be owned by a cloud service provider and connected in a network throughout the Internet. In an infrastructure service model, for example, the cloud service provider may allocate specific resources located in the cloud network 103 to a customer of that cloud network 103. Such specific resources may be grouped as virtual machines 116a-d.

A virtual machine 116a may be a server instance on server 114a in the cloud network 103 that is controlled by the customer located in private enterprise network 101. A customer may have the ability to create, use, and destroy any number of virtual machines 116a-d at will. This ability may be based upon user-defined criteria such as, for example, bandwidth, storage capacity, and processing needs.

The virtual machines 116a-d allocated to a customer may be connected logically to each other inside the cloud. In various embodiments, all virtual machines 116a-d allocated to a customer appear within the same IP subnet, such as, for example, an IP subnet of 10.1.8/24. Virtual machines 116a-d may be physically located on the same server 114a or on different servers 114a-d, but maintain a logical connection to each other. In some embodiments, a virtual machine 116a may migrate to different physical locations, such as a different server 114a within the cloud network.

Virtual stub (vstub) 104 may be a logical network that includes all resources in cloud network 103 allocated to a particular customer. Thus, the virtual stub 104 may include all active virtual machines 116*a-d* in the cloud network 103 allocated to the customer, a series of hypervisors 115*a-d*, which may host and control the allocated virtual machines 116*a-d*, a data center interconnect 113, which may be physically connected to each server 114*a-d* that contains allocated virtual machines 116*a-d*, and a Cloud Data Center CE 112, which may act as a hub for all the allocated virtual machines 116*a-d* in the cloud network 103. As illustrated in FIG. 1, virtual stub 104 does not need its logical network to be physically contiguous and may include networking components connecting different physical servers 114*a-d*, such as the data center interconnect 113. The virtual stub may separate servers 114*a-d* that are allocated to the private enterprise network 101 from a series of servers 119*a*, 119*b* that are within the cloud network 103, but not allocated to the private enterprise network. The series of servers 119*a*, 119*b* may therefore not connect to the private enterprise network 101 or share the same address space.

A customer edge (CE) device 110*a* may be a node in the private enterprise network 101. CE device 110*a* may be a network node, such as a router or switch, configured to transmit packets to other nodes, such as other customer edge routers in private enterprise network 101, provider edge devices 111*a-h* in the service provider network 102, or Cloud Data Center CE 112 in the cloud network 103. CE device 110*a* may be capable of communication with other devices both inside and outside the private enterprise network 101 using multiple layers of the OSI reference model, such as, for example, Layer 3 communications using MPLS (L3 MPLS) and Layer 2 communications using Ethernet and Virtual Private LAN Service (VPLS). In some embodiments, the CE device 110*a* may be a virtual router inhabiting a physical device.

Each provider edge (PE) device 111*a-h* may be a node in service provider network 102 and may be a router, switch, or similar hardware device. The PE devices 111*a-h* may be configured to receive packets from a CE device 110*a* and transmit such packets over the service provider network 102. These packets may be transmitted to other destinations in private enterprise network 101, to destinations in cloud network 103, or to destinations in other networks not shown in FIG. 1.

A Cloud Data Center CE 112 may be a customer edge router and may be implemented by equipment operated by a customer of a cloud service provider. It should be apparent that although referred to as a "customer" edge device, Cloud Data Center CE 112 may be owned and/or operated by the cloud service provider or some other entity. In some embodiments, Cloud Data Center CE 112 represents a hub for the virtual stub 104 inside the cloud network 103. In some embodiments, the physical CE device containing the logical customer edge router 112 may be shared by multiple enterprise networks.

In some embodiments, the cloud network 103 may also contain a directory server. The directory server may maintain a directory of mapping entries. As will be discussed in further detail below, these mapping entries may correlate the assigned IP address of a destination within the enterprise network to the address of the destination within the cloud network 103, using a cloud IP address (cloudIP) and a location IP address (locIP). A location IP address (locIP) identifies the location of a particular switch, e.g. switch 117*a*, within the virtual stub 104. A virtual machine 116*a* has a locIP address that refers to the IP switch 117*a* on which it resides. In addition, a cloud IP address (cloudIP) distinctly refers to each virtual machine 116*a-d* in the virtual stub 104.

The virtual machine 116*a*, may therefore possess a distinct address that is logically separate from its location, as devices may refer to the directory server to locate a virtual machine by its locIP and cloudIP addresses in lieu of an assigned IP address. In one embodiment, a source in private enterprise network 101 may use an assigned IP address within the enterprise network to send information in the form of packets to the virtual machine 116*a* within the cloud network 103. In this instance, the Cloud Data Center CE 112 may receive such packets addressed using an IP header and may encapsulate the received packets sent to the destination virtual machine 116*a* with both the cloudIP address header and locIP address header corresponding to the destination virtual machine 116*a* within the cloud network 103. The Cloud Data Center CE 112 may correlate the enterprise ID (the IP address) with the locIP and cloudIP addresses of a virtual machine through a directory located on a directory server.

As will be discussed in further detail below, the directory in the directory server may contain address entries for active servers and virtual machines in the private enterprise network 101 and cloud network 103. Packets sent from one network to the other may pass through the Cloud Data Center CE 112, which uses the directory to correlate the header of a received packet to the necessary header in the other network. For example, the Cloud Data Center CE 112 uses the directory to lookup cloudIP and locIP address headers to properly send packets within the cloud network. The Cloud Data Center CE 112 may also use the directory to decapsulate cloudIP and locIP address headers originating in the cloud network 103 to encapsulate a packet with the appropriate IP header (such as a L3 header) to send packets within the service provider network 102 and private enterprise network 101.

While only one logical CE is illustrated, alternative embodiments may include multiple logical CEs. In such embodiments, virtual machines 116*a-d* in the enterprise address space may be allocated to different logical CEs, with each logical CE acting as an independent hub. Such an embodiment may also allow directory lookups, as discussed below, to be conducted by each logical CE instead of hypervisors 115*a-d*. Multiple logical CE devices may also obviate the need for locIP and cloudIP headers to cloud destinations in the virtual stub 104, as data packets could instead be tunneled to the appropriate hub logical CE.

A Data Center Interconnect 113 may be a switch or series of switches connecting to a series of servers 114*a-d*. Data Center Interconnect 113 may connect the Cloud Data Center CE 112 directly to the allocated series of servers 114*a-d*. Alternatively, Data Center Interconnect 113 may connect to the series of servers 114*a-d* through a series of intermediate switches 117*a-c*. In such instances, each intermediate switch 117*a-c* may connect to multiple servers 114*a-d* simultaneously. The intermediate switch 117*a* may have a unique location IP (locIP) address within the virtual stub 104. When receiving packets addressed to a virtual machine 116*a* on one of its connected servers 114*a*, the intermediate switch 117*a* may decapsulate the locIP header from the packet and may then forward the packet to the server 114*a* with the corresponding cloudIP address.

A server 114*a* may be a device that provides computing services to clients. More specifically, a server may be a networking device hosting computing resources, such as storage and processing capacity, which a client uses to, for example, execute applications or store files into memory. Thus, server 114*a-d* may be, for example, a chassis-based server (i.e., a blade server) that includes multiple slots, each capable of holding a physical server blade. Each physical server 114a-d may include a hypervisor 115a-d and at least one virtual machine 116a-d.

One or more hypervisors 115a-d may be located on each physical server 114a-d. In one embodiment, hypervisors 115a-d host each allocated virtual machine 116a-d physically located on the physical servers they inhabit. Each hypervisor 115a-d may thereby control one or more virtual machines 116a-d simultaneously.

Hypervisor 115a-d may be aware of the enterprise information, which may include, for example, the cloudIP addresses of each virtual machine it hosts and the locIP address of the intermediate switch 117a-c that hosts the hypervisor 115a-d. Hypervisor 115a-d therefore recognizes the enterprise membership (i.e., enterprise ID) of its hosted virtual machines 116a-d. Hypervisor 115a-d may also intercept traffic relating to its hosted virtual machines 116a-d. When the virtual machine 116a-d is sending the packet to a destination outside of the virtual stub 104 hypervisor 115a-d may encapsulate packets sent from one of its hosted virtual machine 116a-d with both a cloudIP header and locIP header associated with the Cloud Data Center CE 112. Hypervisor 115a-d may also decapsulate the cloudIP header of packets sent to a virtual machine 116a-d hosted by hypervisor 115a-d.

In some embodiments, hypervisor 115a-d recognizes the security parameters to each virtual machine 116a-d it hosts. These security parameters may include, for example, an embedded customer ID to prevent against any unintentional leak of information when a virtual stub 104 changes size. A hypervisor 115a-d may recognize other security features, such as a security token (or pair-wise security token) as will be discussed below, which may prevent intentional attacks by such entities as malicious hypervisors and other telnet attacks.

Figure 2:
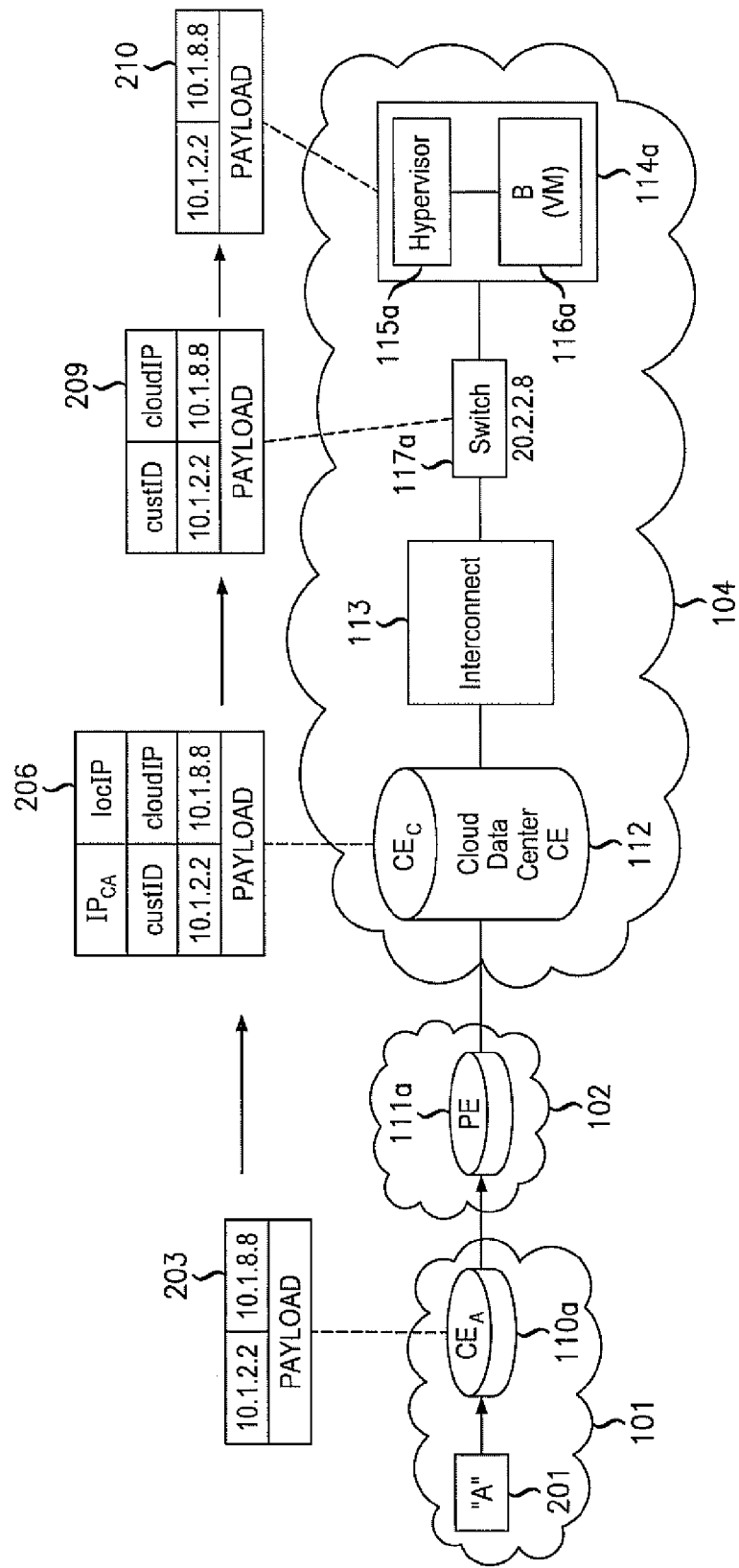
FIG. 2 is a schematic diagram of a packet transfer using an L3 protocol.

FIG. 2 is a schematic diagram of packet transfer using an L3 MPLS protocol. As illustrated in FIG. 2, a device at each endpoint may address a destination using an IP address, where each IP address is inside the IP address space of the enterprise. As will be discussed in further detail below, the virtual stub 104 in cloud network 103 is assigned an IP subnet (illustrated in FIG. 2 as 10.1.8) inside the IP address space (illustrated in FIG. 2 as 10.1) of the private network enterprise 101. Accordingly, each virtual machine 116a-d inside the virtual stub 104 is also assigned a corresponding address within the IP subnet.

It should be apparent that the nature of the cloud network 103 may preclude the use of specific, static IP addresses inside the cloud network 103 to determine the location of a virtual machine 116a-d. For example, a virtual machine 116a may migrate dynamically to a different physical server 114d, making it difficult to determine an appropriate IP address to use when addressing a particular virtual machine 116a at any given time. Within the cloud network 103, therefore, a virtual machine 116a is identified by its enterprise ID, location IP address, and cloud IP address. This addressing information may be stored in a directory in a directory server.

Accordingly, a transmission of packets to destinations within the cloud network 103 may involve double-encapsulating a packet, encapsulating each packet with an inner cloud IP header and an outer location IP header. If the packet is being sent to a destination in the private enterprise network 101 from, for example, a virtual machine 116a in the cloud network 103, the cloudIP and locIP header encapsulating the packet correspond to the address for the Cloud Data Center CE 112, which acts as a hub for the virtual stub 104 containing a distinct cloud IP address, forwarding the packet to the proper IP address inside the private enterprise network 101 using, for example, Layer 3 protocols.

In the example illustrated in FIG. 2, a source 201 (location "A") in the private enterprise network 101 at IP address 10.1.2.2 sends a packet to destination virtual machine 116a (location "B"), a virtual machine 116a at IP address 10.1.8.8 in the cloud network 103. Source "A" 201, using Interior Gateway Protocol (IGP) routing, directs the packet 203 to customer edge router $CE_A$ 110a in the private enterprise network 101. The header of exemplary packet 203 includes the source IP address header (10.1.2.2) and the destination IP address header (10.1.8.8) in addition to the payload.

Using MPLS label stacking, the packet may be sent through at least one provider edge device 111a in service provider network 102 to the Cloud Data Center CE 112 in cloud network 103. As will be apparent to those of skill in the art, the packet may be sent through the private enterprise network 101 and service enterprise network 103 to the Cloud Data Center CE 112 according to another protocol, such as Layer 3 tunneling. Though FIG. 2 includes a single provider edge device 111a, other embodiments may include a series of connected provider edge devices 111a-f when the packet is tunneled to the Cloud Data Center CE 112.

Cloud Data Center CE 112, upon receipt of the packet 203, may then query the directory server for the location IP address (locIP) and cloud IP address (cloudIP) associated with destination "B" inside the cloud network 103. If Cloud Data Center CE 112 finds the corresponding entry, Cloud Data Center CE 112 may then double encapsulate the packet 203 with both the cloudIP header and the locIP header associated with destination "B," as shown by double-encapsulated packet 206. Such double encapsulation involves first encapsulating the packet 203 with the cloudIP header, then encapsulating the modified packet with the outer locIP header. Cloud Data Center CE 112 then sends the double-encapsulated packet 206 through the Data Center Interconnect 113 and the cloud network 103 to the Layer 3 intermediate switch 117a with the corresponding destination locIP address.

The intermediate switch 117 then decapsulates the locIP header from the packet 206 and transmits the modified packet 209 to the corresponding destination cloudIP address. At the server 114a corresponding to the destination cloudIP address, the hypervisor 115a on server 114a decapsulates the cloudIP header from the modified packet 209 and transmits the packet 210 to the destination virtual machine "B" 116a on the server 114a. In some embodiments, the hypervisor 115a may also verify a security token in packet 210 to verify that the packet is from the same enterprise network.

FIG. 3 is an exemplary Virtual Routing and Forwarding (VRF) table 300 of the logical CE router housed at the Cloud Data Center CE 112. Other devices, such as customer edge devices 110a-e in private enterprise network 101 and provider edge devices 111a-h in service provider network 102 may also maintain similar VRF tables 300.

The entIP field 301 corresponds to the Enterprise ID of a location. In an exemplary embodiment, resources within the virtual stub 104 are assigned IP addresses within an assigned IP subnet, resulting in resources within both the cloud network 103 and the private enterprise network 101 sharing the same address space. In the illustrated embodiment, resources in the cloud use 10.1.8/24 as an IP subnet (with/24 denoting 24 bits in the subnet), while devices outside the cloud may use other addresses in the same IP address space, such as the customer edge device entry 313 in the private enterprise network 101 using an IP address within the 10.1/16 allocated IP subnet.

The locIP field 302 corresponds to the location IP address of devices in cloud network 103. The locIP corresponds to the address of the intermediate switch 117a in cloud network 103 that hosts the entry's virtual machine 116a. In the illustrative embodiment of FIG. 3, the virtual machine entry 311 has a location IP address of 20.2.2.8, corresponding to an intermediate switch 117a that hosts the corresponding virtual machine 116a.

The cloudIP field 303 may correspond to the cloudIP address of a virtual machine 116a in the cloud network 103. The intermediate switch 117a at a locIP address 302 has distinct, non-overlapping cloudIP addresses 303 for each virtual machine 116a it hosts. The Cloud Data Center may allocate the cloudIP addresses among the virtual machines 116a-d in the cloud network 103. In the illustrative embodiment, virtual machine entry has a cloudIP of 20.2.2.1, so that when intermediate switch 117a receives a packet for virtual machine 116a, the switch may forward the packet to the specific virtual machine 20.2.2.1 through the hypervisor 115a.

The nextHop field 304 refers to the next location in the enterprise network to which a device should send a packet. In the illustrative embodiment, entry 313 has a entIP address within the IP subnet 10.1/16, corresponding to a location in the private enterprise network 101. Accordingly, that location does not have applicable locIP or cloudIP addresses, as those may only be used by addresses within the cloud network 103. The corresponding nextHop entry from the Cloud Data Center CE 112 is therefore to the connected provider edge device 111a, which upon receipt of packets for the destination within the 10.1/16 subnet, will refer to its own VRF table and forward it to the entry's corresponding nextHop address. This process will continue on each device in sequence until the packet eventually reaches the destination IP address within the 10.1/16 subnet in the private enterprise network 101.

FIG. 4 is an exemplary directory table in the directory server. The directory table 400 is similar to the Cloud Data Center VRF table 300, maintaining entIP field, locIP field, and cloudIP field, except that the directory table 400 does not maintain a nextHop field 304. This is because the directory table 400 does not maintain forwarding information; rather, the directory table 400 simply maintains a comprehensive listing of locIP 302 and cloudIP 303 addresses for locations in both the private enterprise network 101 and the cloud network 103.

In the illustrative embodiment, the "Default" entry 411 has only $IP_{CA}$ as its locIP 302 address and no applicable cloudIP 303 address. The default entry 411 refers to devices within the private enterprise network 101, which have no explicit locIP 302 or cloudIP 303 addresses. The $IP_{CA}$ entry means that packets with destinations not specifically listed as an entry 412 with valid locIP 302 and cloudIP 303 addresses in the directory 400 should be directed towards the Cloud Data Center CE 112, which will then use its VRF table 300 to forward the packet to the proper destination within the private enterprise network 101.

In an exemplary embodiment, a virtual machine 116 may shut down. When a virtual machine shuts down, the VM's entry in directory 400 at the directory server may be deleted. In another exemplary embodiment, a VM may migrate to a different server, for example, from 114a to 114c. When a VM migrates to another server 114c, its locIP address will be updated in the directory 400 to reflect the new server 114c where the VM 116a is now located. A virtual machine 116a may also migrate to a new Cloud Data Center CE 112. In the case of a stale entry (a device with an outdated VRF table), the switch 117a at the former locIP address will forward the wrongly-addressed packet to the directory server at the new Cloud Data Center CE. The directory server will then correct the VRF table of the stale switch via unicast.

Figure 5:
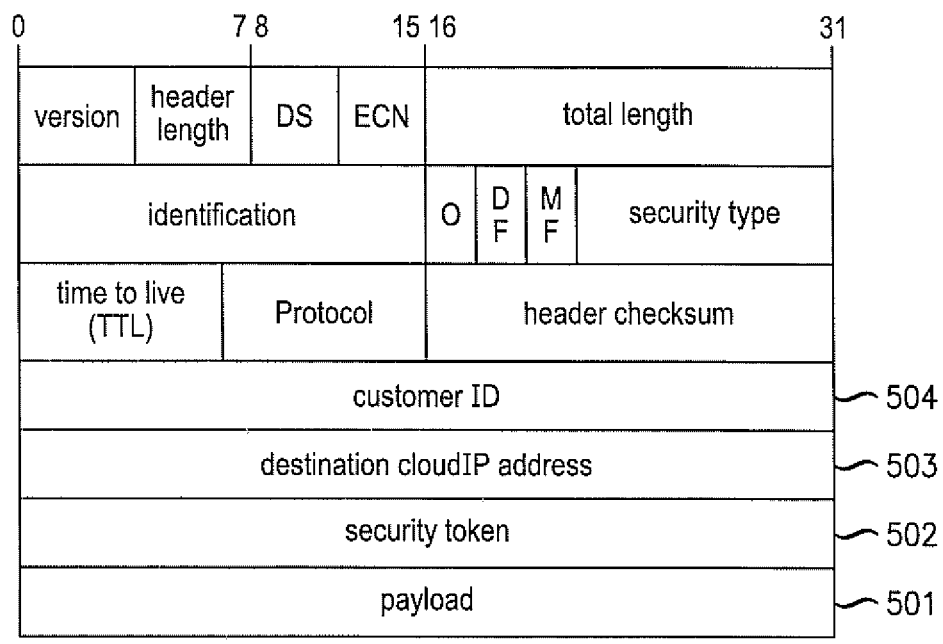
FIG. 5 is a schematic diagram illustrating the contents of an exemplary datagram transmitted through the extended enterprise network.

FIG. 5 is an exemplary illustration of a datagram used in the system. The datagram 500 may represent a packet. FIG. 5 illustrates an exemplary datagram of a double-encapsulated packet that contains both the inner cloudIP header and the outer locIP header, destination cloudIP address 503, in addition to the payload 501.

The datagram may also include a security token 502. The security token may comprise a combination of, for example, an enterprise-specific key, enterprise ID, and destination IP address. A hypervisor 115a may attempt to verify the security token 502 and if a packet contains the wrong security token 502, drop the packet. In one embodiment, a packet may be encoded by a pair-wise security token 502. A pair-wise security token may be derived from a pair-wise key, which is an individual key used for only one user. This may help to prevent attacks from malicious hypervisors 115a by localizing the attack to virtual machines 116a-d that have security associations with the malicious hypervisor 115a.

In addition, datagram 500 may include Customer ID 504 for security reasons, as the Customer ID 504 prevents sending packets to virtual machines 116a-d not within the virtual stub 104. This situation may occur, for example, if a virtual machine 116a-d migrates or is shutdown and devices continue to send traffic to that virtual machine 116. In one embodiment, the payload 501 may be encrypted with a shared group key. The shared group key may be shared amongst members of a given customer group.

Figure 6:
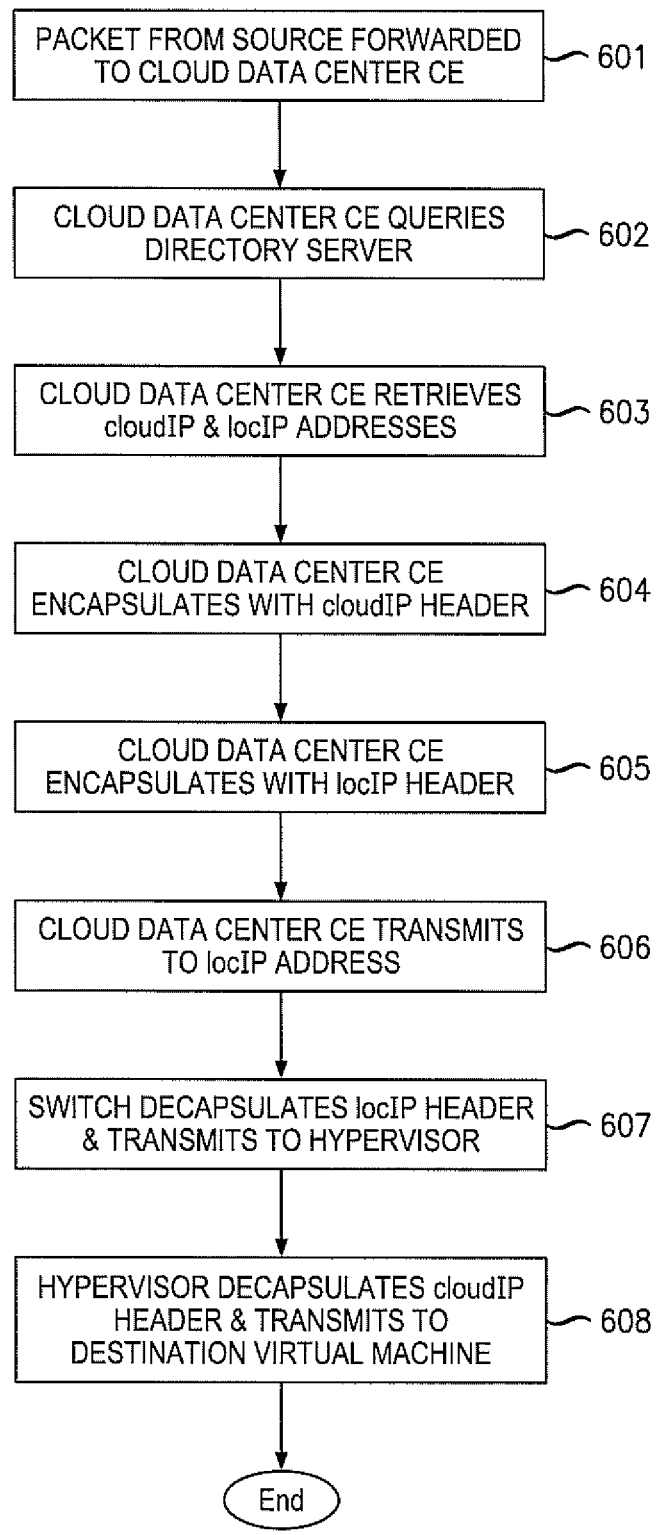
FIG. 6 is a flowchart of an exemplary embodiment of a method of sending a packet from a location in the private enterprise network to a destination in the cloud network.

FIG. 6 is a flowchart of an exemplary embodiment of a method 600 of sending a packet 203 from a source in the private enterprise network 101 to a destination in the cloud network 103 using double encapsulation. At step 601, a packet from source "A" in the private enterprise network 101 may be transmitted to a logical CE device 110a in the private enterprise network 101, which may forward the packet through at least a PE device 111a in service provider network 102 to the Cloud Data Center CE 112 in the cloud network 103.

In step 602, the Cloud Data Center CE 112 may query a directory server. The query may entail a lookup of directory 400 for the location IP (locIP) and cloud IP (cloudIP) of the destination "B" if the location is inside the cloud network 103. If destination "B" is in the cloud network 103, in step 603, the Cloud Data Center CE 112 may retrieve the corresponding destination cloudIP address and location IP addresses.

In step 604, Cloud Data Center CE 112 may encapsulate the packet with a header corresponding to the retrieved cloudIP address. In step 605, Cloud Data Center CE 112 may encapsulate the modified packet with a header corresponding to the retrieved locIP address. In step 606, the Cloud Data Center CE 112 may transmit the double-encapsulated packet 206 through cloud network 103 to the corresponding locIP address.

In step 607, an intermediate switch 117a at the locIP address may decapsulate the locIP header from the double-encapsulated packet 206 and may transmit the modified packet 209 to the corresponding cloudIP address. In step 608, the hypervisor 115a at the server 114a at the corresponding cloudIP address may decapsulate the modified packet 209 and may transmit the packet 210 to the corresponding virtual machine 116a at the destination "B." In an alternative embodiment, the hypervisor 115a first may validate the received packet 210 by verifying the included security token 502 before transmitting the packet 210 to the virtual machine 116a.

Figure 7:
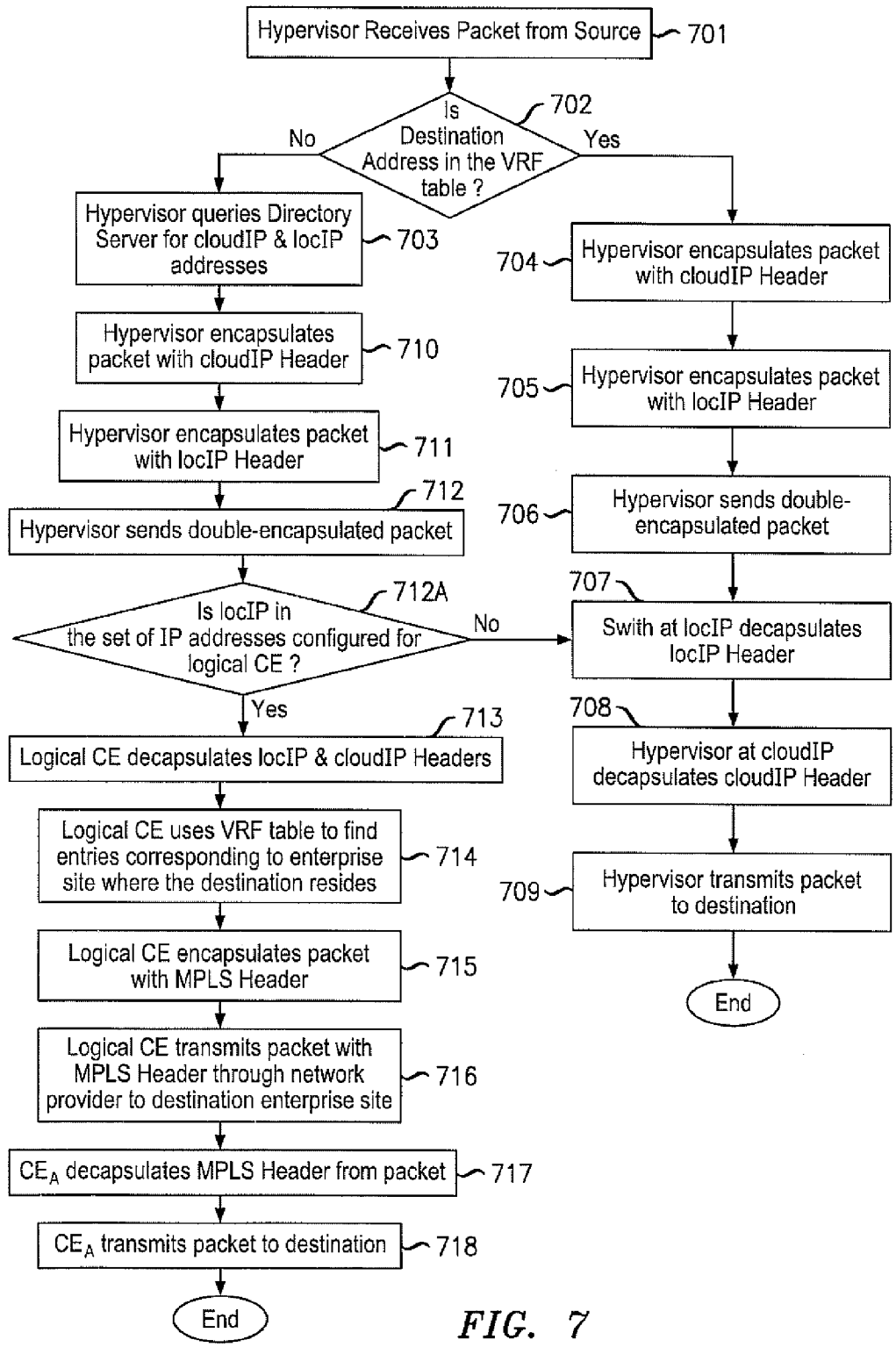
FIG. 7 is a flowchart of an exemplary embodiment of a method of sending a packet from a location inside the cloud network.

FIG. 7 illustrates an exemplary method 700 of sending a packet from a source in the cloud network 103. In step 701, the hypervisor 115a on the server 114a of source "B" receives a packet 210 from the source "B" virtual machine 116a. In step 702, the hypervisor 115a checks whether the destination address is in its VRF table. Step 704 follows if a forwarding entry for destination "A" 201 is present, whereas step 703 follows if the destination address "A" 201 is not listed.

In step 704, the hypervisor 115a encapsulates the packet 210 with the corresponding cloudIP header. In step 705, the hypervisor 115a then encapsulates the modified packet 209 with a corresponding locIP header. In step 706, the hypervisor 115a sends the double-encapsulated packet 206 to the corresponding locIP address.

In step 707, if the destination "A" is within the cloud network 103, the intermediate switch 117b at the corresponding locIP address decapsulates the locIP header from the double-encapsulated packet 206 and sends the modified packet 209 to the corresponding cloudIP address. In step 708, the hypervisor 115c at the corresponding cloudIP address decapsulates the modified packet 209. In step 709, the hypervisor 115c transmits the packet 210 to the destination "A" VM 116c. In some embodiments, the hypervisor 115c first checks the modified packet's security token 502 for verification before sending the packet 203 to the destination "A" VM.

When, in step 702, it is determined that the destination is in the private enterprise network 101, method 700 proceeds to step 703. In step 703, the hypervisor 115a queries the directory server for the destination "A" cloudIP address and locIP address. When the destination is in the private enterprise network 101, the corresponding destination locIP is the IP address of the intermediate switch IP 117a connected to the Cloud Data Center CE 112 and the corresponding cloudIP address is the IP of the Cloud Data Center CE 112. Method 700 proceeds to 710, which corresponds to step 704, described in detail above. Method 700 then proceeds to steps 711 and 712, which correspond to steps 705 and 706 described in detail above. This results in the cloudIP address of the double-encapsulated packet 209 corresponding to the Cloud Data Center CE 112.

Accordingly, in step 712a, the Cloud Data Center CE 112 determines if the locIP address is in its IP address space. If it is not, method 700 proceeds to step 707, as the packet is delivered to another VM in the cloud network 103. If the locIP is in the logical CE's 112 IP address space, the method 700 proceeds to step 713, where Cloud Data Center CE 112 decapsulates the double-encapsulated packet 206 of both its locIP and cloudIP headers. In step 714, the Cloud Data Center CE 112 uses its VRF table 300 to find the corresponding entry for the destination address "A" in the private enterprise network 101.

In step 715, the Cloud Data Center CE 112 encapsulates the packet 203 with a Layer 3 header, such as an MPLS header corresponding to the destination "A" address within the private enterprise network 101. In step 716, the Cloud Data Center CE 112 transmits the MPLS packet through private enterprise network 101 to destination "A" 201. In step 717, the customer edge device 111a at the destination "A" address in private enterprise network 101 decapsulates the MPLS header of the MPLS packet and in step 718, the customer edge device 111a transmits the packet 203 to the corresponding destination address "A" 201.

Figure 8:
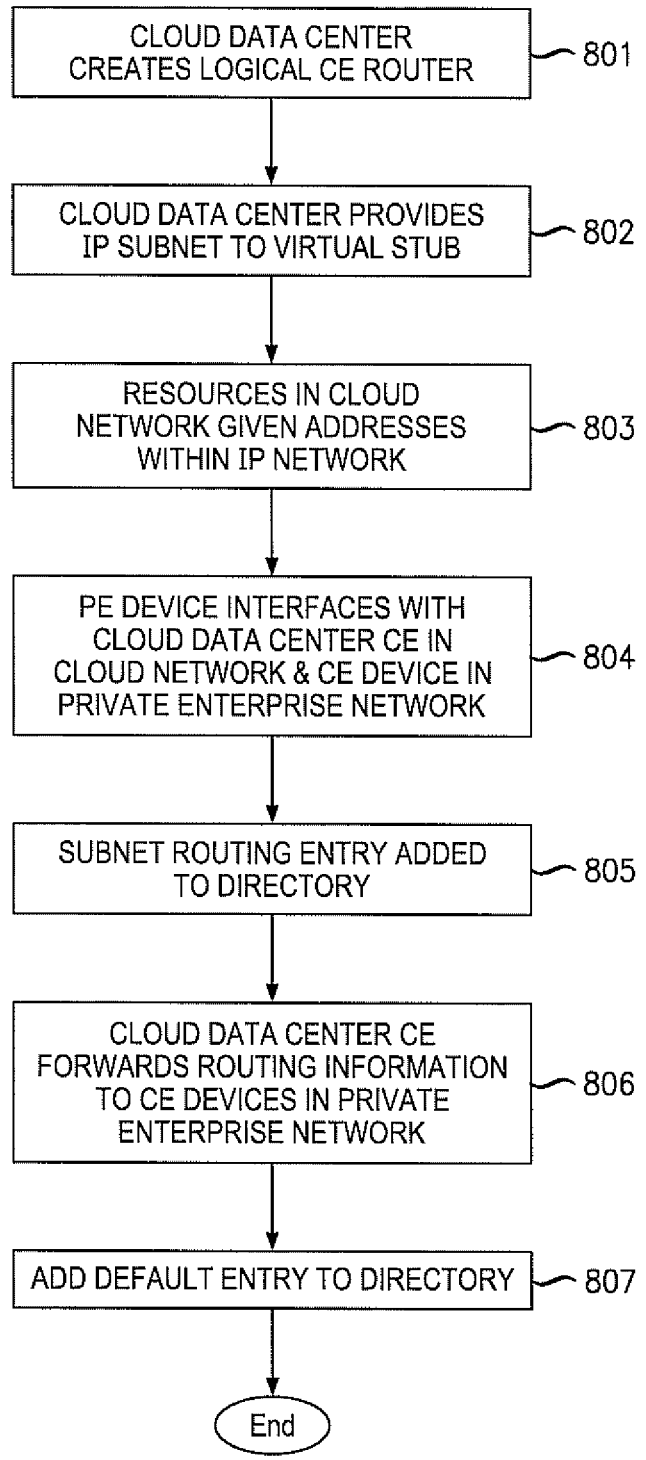
FIG. 8 is a flowchart of an exemplary embodiment of a method of incorporating allocated cloud resources into a private enterprise network.

FIG. 8 illustrates an exemplary method of incorporating allocated cloud resources into a private enterprise network. In step 801, a Cloud Data Center creates a logical customer edge (CE) router, Cloud Data Center CE 112. The logical CE router is a virtual router that acts similarly to customer edge routers in the private enterprise network 101. The Cloud Data Center creates a logical CE because one logical CE hosts one virtual stub 104 and the Cloud Data Center is capable of hosting multiple virtual stubs. In step 802, the Cloud Data Center provides an IP subnet to the logical CE router. The logical CE router 112 acts as the hub of the virtual stub 104. The virtual stub 104 is a logical network in the cloud network 103 that comprises the resources allocated by a cloud service provider to the private enterprise network 101. The resources inside the virtual stub 104 may be isolated from other cloud resources outside the virtual stub 104.

In step 803, each resource inside the virtual stub 104 is allocated an address within the provided IP subnet, such as assigning a virtual machine 116 the IP address 10.1.8.8 when the assigned IP subnet is 10.1.8/16. In step 804, a provider edge router 111b in service provider network 102 is provisioned to interface with the virtual stub 104 by connecting to a customer edge device 110a in the private enterprise network 101 and the Cloud Data Center CE 112.

In step 805, the Cloud Data Center may add a routing entry 412 for the provided subnet to a directory 400 on the directory server in the Cloud Data Center CE 112. Because the resources in the virtual stub 104 are addresses within the provided IP subnet, simply adding the subnet allows these resources to receive packets from other sources, as packets for the subnet are may now be transmitted to the Cloud Data Center CE 112 and then forwarded to the proper address within the virtual stub 104.

In step 806, the Cloud Data Center CE 112 forwards the updated routing information to the customer edge devices 110a-d located in the private enterprise network 101. In step 807, the Cloud Data Center CE 112 adds a default entry to the directory 400 that maps the addresses of devices 110a-d the private enterprise network 101 to the Cloud Data Center CE 112, where addresses in the private network have a locIP and cloudIP address corresponding to the logical CE's 112 locIP and cloudIP address. This enables packets sent from within the cloud network 103 to a destination in the private enterprise network 101 to first send packets to the Cloud Data Center CE 112, which then forwards the packet to the appropriate destination in the private enterprise network 101. Cloud Data Center CE 112 therefore acts as a main hub for communications between devices in private enterprise network 101 and cloud network 103, as communications between locations in these two networks are first forwarded to the Cloud Data Center CE 112, which then uses the directory server to encapsulate packets with the appropriate IP headers and forwards them through the other network onto its ultimate destination.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g., router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method of incorporating resources of a cloud network into a private enterprise network, the method comprising:
    creating, by a Cloud Data Center, a logical customer edge router in the Cloud Data Center in the cloud network;
    receiving, by the Cloud Data Center, an IP subnet that is within an address space of the private enterprise network;
    allocating, by the Cloud Data Center, an IP address from the IP subnet to a plurality of resources within a logical network in the cloud network comprising resources allocated to the private enterprise network;
    adding, by the logical customer edge router, a routing entry for said IP subnet at a virtual routing and forwarding table at the Cloud Data Center;
    forwarding, by the logical customer edge router, the routing entry to at least one customer edge router in the private enterprise network; and
    adding, by the logical customer edge router, a default entry in a directory server at the Cloud Data Center, the default entry mapping a plurality of IP addresses associated with devices belonging to the private enterprise network to at least one IP address of the logical customer edge router in the Cloud Data Center.

2. The method of claim 1, further comprising:
    connecting the logical customer edge router in the Cloud Data Center to a logical customer edge router of the private enterprise network.

3. The method of claim 2, wherein the logical customer edge router in the Cloud Data Center and the customer edge router of the private enterprise network are connected through at least a provider edge router in a service provider network.

4. The method of claim 3, wherein the provider edge router is a virtual router.

5. The method of claim 1, wherein the resources in the logical network are logically isolated from other resources in the cloud network and not in the logical network.

6. A method of sending a packet received from a source in a private enterprise network to a destination in a cloud network allocated to the private enterprise network, said method comprising:
    receiving, by a logical customer edge router in a Cloud Data Center in the cloud network, a packet from a source in the private enterprise network, wherein the logical customer edge router is located in a logical network in the cloud network comprising resources allocated to the private enterprise network;
    querying, by the logical customer edge router, a directory server for the destination's cloud IP address and location IP address;
    encapsulating, by the logical customer edge router, the received packet when the logical customer edge router determines the destination is within the logical network, wherein the received packet is encapsulated with the destination's corresponding cloud IP header;
    further encapsulating, by the logical customer edge router , the received packet with the destination's corresponding location IP header;
    forwarding, by the logical customer edge router, the received packet to the destination, wherein the Cloud Data Center forwards the received packet through the destination location IP address to the destination cloud IP address.

7. The method of claim 6, further comprising:
    decapsulating, by a switch at the destination's location IP address, the location IP header of the received packet;
    forwarding, by the destination switch, the received packet to the destination's cloud IP address;
    decapsulating, by a destination server at the destination's cloud IP address, the cloud IP header of the received packet; and
    forwarding, by the destination server, the packet to the destination within the destination server.

8. The method of claim 7, further comprising:
    verifying, by a hypervisor in the destination server, that the received packet is from the same enterprise, wherein the hypervisor inspects a security token in the header of the received header; and
    discarding, by the hypervisor, the packet when the packet's security token is not verified.

9. The method of claim 8, wherein the security token comprises at least an enterprise-specific key, an enterprise ID, and a destination IP address.

10. The method of claim 6, wherein the logical customer edge router receives the packet from the source in the private enterprise network using Layer 3 protocols.

11. The method of claim 6, wherein the querying step comprises querying a directory at the directory server.

12. A method of forwarding a packet originating from a source in a cloud network allocated to a private enterprise network, said method comprising:
    receiving, by a hypervisor in a server hosting a source virtual machine, a packet, the virtual machine being located in a logical network in the cloud network comprising resources allocated to the private enterprise network;
    querying, by the hypervisor, a directory server in the logical network for a destination address when the packet's destination address is not in a virtual routing and forwarding table at the server,
    encapsulating, by the hypervisor, the packet with a cloud IP header, the cloud IP header corresponding to the destination's cloud IP address received from the directory server;
    further encapsulating, by the hypervisor, the packet with a location IP header, the location IP header corresponding to the destination's cloud IP address received from the directory server; and
    forwarding, by the hypervisor, the packet to the location IP address.

13. The method of claim 12, further comprising:
    decapsulating, by a logical customer edge router in a Cloud Data Center, the location IP header of the packet; and
    decapsulating, by the logical customer edge router, the cloud IP header of the packet.

14. The method of claim 12, further comprising:
    computing, by the hypervisor, a security token comprising a combination of an enterprise-specific key, enterprise ID, and destination IP address; and
    encapsulating, by the hypervisor, the packet with the security token.

15. The method of claim 14 further comprising:
    decapsulating, by a customer edge router at the destination in the private enterprise network, the Layer 3 header;

verifying, by the customer edge router at the destination, the security token in the header of the received packet and discarding; and discarding, by the customer edge router at the destination, the received packet when the security token is not verified.

16. The method of claim 13, further comprising:

encapsulating, by the logical customer edge router, a Layer 3 header corresponding to the destination's IP address in the private enterprise network; and forwarding, by the logical customer edge router, the packet to the destination in the private enterprise network.

17. The method of claim 16, wherein the Layer 3 header is an MPLS header.

18. The method of claim 16, further comprising:

decapsulating, by a customer edge router at the destination in the private enterprise network, the Layer 3 header.

19. A system extending a private enterprise network to a logical network in a cloud network comprising resources allocated to the private enterprise network, the system comprising:

a series of servers in the logical network sharing the same IP address space as the private enterprise network, at least one server including:
 a virtual machine comprising resources on said server allocated to the private enterprise network, and
 a hypervisor hosting the virtual machine, and a logical customer edge router in the logical network sharing the same IP address space as the private enterprise network connecting the logical network to the private enterprise network; and at least a customer edge router in the private enterprise network.

20. The system of claim 19, wherein the logical network is isolated from cloud resources outside the logical network.

21. The system of claim 19, wherein the virtual machine is located with a location IP address and a cloud IP address, the virtual machine receiving information through the cloud network with data packets encapsulated first with the corresponding cloud IP header and further encrypted with the corresponding location IP header.

22. The system of claim 19, wherein the logical network also includes at least a Data Center Interconnect switch operatively coupled to at least the series of servers and the logical customer edge router.

23. The system of claim 19, wherein the logical network further includes a switch connecting a least one of the servers to the logical customer edge router.

24. The system of claim 19, further comprising:

a service provider network comprising at least a provider edge router, the service provider network connecting the customer edge router in the private enterprise network and the logical customer edge router in the logical network in the cloud network.

* * * * *